United States Patent [19]
Vanderpool et al.

[11] Patent Number: 5,454,978
[45] Date of Patent: Oct. 3, 1995

[54] INHIBITING DEPOSITION OF OIL ON SURFACE OF WATER-CARRYING SYSTEM

[75] Inventors: Daniel P. Vanderpool; Susan P. Rey, both of Coraopolis, Pa.

[73] Assignee: Calgon Corporation, Pittsburgh, Pa.

[21] Appl. No.: 53,778

[22] Filed: Apr. 28, 1993

[51] Int. Cl.$^6$ .................................................. B01J 13/00
[52] U.S. Cl. ...................... 252/312; 210/925; 252/180; 252/357; 507/90
[58] Field of Search ................................ 252/312, 357, 252/180; 507/90; 210/925

[56] References Cited

U.S. PATENT DOCUMENTS

| | | | |
|---|---|---|---|
| 2,159,967 | 5/1939 | Engelmann | 554/108 |
| 2,490,760 | 12/1949 | Henn et al. | 430/432 |
| 3,356,727 | 12/1967 | Koebner et al. | 252/357 X |
| 3,494,962 | 2/1970 | Miller, Jr. et al. | 252/357 X |
| 3,594,139 | 7/1971 | Bouffard | 252/392 X |
| 3,698,901 | 10/1972 | Elins et al. | 430/145 |
| 3,876,551 | 4/1975 | Laufer et al. | 252/98 |
| 4,014,800 | 3/1977 | Kleber | 252/547 X |
| 4,174,296 | 11/1979 | Kass | 252/312 |
| 4,186,077 | 1/1980 | Carlos | 208/3 |
| 4,502,962 | 3/1985 | Becker et al. | 210/925 X |
| 4,810,263 | 3/1989 | Zimmerman et al. | 44/408 |
| 4,826,506 | 5/1989 | Vardi et al. | 44/422 |
| 4,832,872 | 5/1989 | Scandel | 252/547 |
| 4,983,769 | 1/1991 | Bertocchio et al. | 252/357 X |
| 5,120,469 | 6/1992 | Smith et al. | 252/357 |

FOREIGN PATENT DOCUMENTS 1125259  8/1966  United Kingdom .

*Primary Examiner*—Richard D. Lovering
*Attorney, Agent, or Firm*—Craig G. Cochenour

[57] ABSTRACT

A surface active composition for dispersing an oil in an aqueous media and/or for inhibiting deposition of oil on a surface of a water carrying system is disclosed. Preferably, the water carrying system is at least one system selected from the group consisting of a cooling tower, a cooling tower fill, means for heat exchange, means for industrial processing, and a body of water. A method for inhibiting deposition of an oil on a surface of a water carrying system is also provided.

6 Claims, No Drawings

INHIBITING DEPOSITION OF OIL ON SURFACE OF WATER-CARRYING SYSTEM

BACKGROUND OF THE INVENTION

1. Field of the Invention

This invention relates to surface active compositions and methods using the surface active compositions for treating a water carrying system containing oil and water.

2. Brief Description of the Background Art

Industrial activities employing water carrying systems such as, for example, systems for cooling industrial processes frequently are contaminated by oils and lubricants as a result of defective equipment such as, for example, defective bearing seals or pump seals in contact with the water. These industrial activities include but are not limited to, such as for example, the automotive industry, metal parts manufacturing and machining industries, steel mills, petroleum refining operations, adhesive industries, paint industries, textile manufacturing, paper industries, sewage treatment operations and meat and food processing plants.

The mixture of oil phase and water phase in which either phase may be dispersed in the other is known by those skilled in the art as an emulsion. When the oil phase is dispersed throughout the aqueous continuous phase, the system is referred to as an oil-in-water (o/w) emulsion. The type of oil found in the emulsion and the concentration of the oil will vary depending on the industry. For example, the oil may include animal, vegetable, mineral or synthetic oils. More specifically, these oils may include, for example, hydrocarbons such as tannins or greases, light hydrocarbons such as gasoline, lubricating oil, hydraulic pressure fluids, cutting oils, grinding fluids or animal processing oils. The concentration of the oil in the aqueous media of the water carrying system may range, for example, from about 0.0001 to greater than 10% by volume.

In regard to water carrying systems such as industrial cooling systems, the presence of oil in the cooling system waters is detrimental due to the oil's adherence onto the surfaces of the cooling system. Adherence of oil to the surfaces of the cooling system results in restricted flow of cooling water through, such as for example, heat exchanger tubes because of the reduction of the diameter of the exchanger tubes, reduced heat transfer efficiency, and buildup of oil residue within the cooling tower fill creating the potential for structural failure of the cooling tower.

It will be appreciated, therefore, that compositions capable of effectively dispersing an oil in an aqueous media are needed for inhibiting oil deposition on the surfaces of water carrying systems and more specifically on the surfaces of the cooling tower and cooling tower fill.

It will be understood by those skilled in the art that the oil-in-water system generated by industrial activity may include a wide range of contaminants in addition to oil such as, for example, calcium salts such as calcium carbonate and calcium sulfate, magnesium silicate, iron, manganese, chromate and other inorganic matter. Therefore, treatment of an industrial oil-in-water system may include not only the dispersion of oil in the aqueous media, but also the need for deposit control.

It will be understood by those skilled in the art that a surface active composition not only must disperse the oil phase in the water phase but must also be effective at the operating pH of the aqueous media, and be compatible with other chemicals used for scale inhibition, and corrosion and microbiological control.

A variety of surface active compositions have been proposed for dispersing and emulsifying oil in an aqueous media.

It is generally known by those skilled in the art that nonionic surface active compositions (surfactants) such as, for example, sorbitan monostearate, nonylphenoxy poly(ethyleneoxy) ethanol and copolymers of propylene oxide and ethylene oxide, and blends thereof, may be used to disperse or emulsify oil in water. Although these nonionic surfactants have been used to disperse oil in an aqueous media, they have drawbacks. For example, they lose effectiveness at higher temperatures and frequently do not optimally chemically interact with oil.

It is also generally well known by those skilled in the art that anionic surface active compositions such as, for example, sodium dioctyl sulfosuccinate, and cationic surface active agents such as, for example, dicocodimethyl ammonium chloride may be employed to disperse oil in aqueous media. However, the anionic surface active compositions and the cationic surface active compositions have a disadvantage of being incompatible with each other when both are employed as components of a water treatment program.

European Patent No. 1,125,259 discloses a process for dyeing synthetic polyamide fibers in an acidic aqueous dyebath wherein the dyeing is carried out in the presence of an amine oxide.

U.S. Pat. No. 2,490,760 discloses a method of preventing water spots on gelatin silver halide emulsion films during drying which includes treating the film with a solution containing a cationic wetting agent consisting of a dimethyl alkyl amine oxide.

U.S. Pat. No. 2,159,967 discloses the use of amine oxide compositions for preparing emulsions of the water-in-oil type such as emulsions of water in organic solvents used in the dry cleaning business. This patent states that amine oxides may be used to break petroleum emulsions.

U.S. Pat. No. 3,594,139 discloses a rust inhibitor concentrate for blending with gasoline comprising from 30 to 60 weight percent of a tertiary amine oxide, from 30 to 60 weight percent of a liquid aromatic hydrocarbon and from 5 to 20 weight percent of an aliphatic alcohol.

U.S. Pat. No. 3,698,901 discloses a photographic element comprising a support having at least one photographic silver salt and an oleophilic complex of a photographic addendum containing a hydroxyl or amino group with an organic Group V element oxide or an organic amine oxide. This patent states that the oleophilic complex has the property of releasing the photographic addendum in the presence of alkali.

U.S. Pat. No. 3,876,551 discloses a perfumed single phase aqueous alkali metal hypochlorite solution suitable for laundry and general domestic bleaching and sterilizing. This patent teaches an aqueous solution of at least one alkali metal hypochlorite containing a stable perfume oil and a surface active agent consisting solely of an amine oxide composition. This patent states that the amine oxide composition is the sole detergent and that the aqueous alkali metal hypochlorite solution containing the amine oxide composition has a pH range of from 12 to 13.5.

U.S. Pat. No. 4,186,077 discloses a process for oxidizing liquid hydrocarbon comprising blowing through a liquid mass of the hydrocarbons an oxidizing gas in the presence of a minor amount of a tertiary amine oxide.

In spite of this background material, there remains a very real and substantial need for a surface active composition useful for the dispersion of oil in an aqueous media and a method for substantially inhibiting deposition of an oil on a surface of a water carrying system.

SUMMARY OF THE INVENTION

The present invention has met the above-described needs. The present invention provides a surface active composition useful for the dispersion of oil in an aqueous media and/or for substantially inhibiting deposition of the oil on a surface of a water carrying system comprising (A) water containing said oil and (B) at least 0.1% by weight, based on the weight of (A), of a surface active agent having the general structural formula (I)

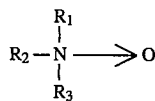

(I)

wherein $R_1$ is a radical selected from the group consisting of (a) a first aliphatic group selected from the group consisting of (1) an alkyl and (2) an alkene having from about 1 to 3 carbon-carbon double bonds, wherein the first aliphatic group has from about 8 to 20 carbon atoms and wherein the carbon atoms have either a straight chain or branched chain arrangement, (b) an amido group comprising the general structural formula (II)

(II)

wherein n is an integer from about 7 to 20, z is an integer from about 1 to 4, and t is an integer from about 1 to 5. $R_2$ and $R_3$ are the same or different radicals selected independently from the group consisting of (a) a second aliphatic group selected from the group consisting of (1) an alkane and (2) an alkene having from about 1 to 3 carbon-carbon double bonds, wherein the second aliphatic group has from about 1 to 12 carbon atoms and wherein the carbon atoms have either a straight chain or branched chain arrangement, (b) a polyalkylene oxide group comprising the general structural formula (III)

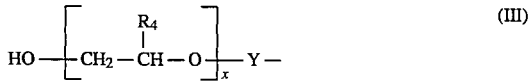

(III)

wherein x is zero or an integer from about 1 to 20, $R_4$ is selected from the group consisting of hydrogen and an alkyl radical having from about 1 to 10 carbon atoms, and wherein Y is one of the alkylene groups comprising the general structural formula (IV)

(IV)

wherein $R_5$ and $R_6$ are each hydrogen, or wherein $R_5$ is hydrogen when $R_6$ is —$CH_3$, or wherein $R_5$ is —$CH_3$ when $R_6$ is hydrogen, and In a preferred embodiment of this invention, an effective amount of the surface active agent as described herein is added to an aqueous media for the purpose of inhibiting, preventing, limiting, and/or restricting deposition of the oil on a surface of a water carrying system which includes, but is not limited to, a cooling tower, a cooling tower fill, means for heat exchange, means for industrial processing or a body of water.

In another embodiment of this invention, a method is provided for substantially inhibiting, preventing, limiting, and/or restricting deposition of oil on a surface of a water carrying system comprising adding to an aqueous media an effective amount, preferably at least about 0.1 ppm, on an active basis, based on the weight of the water in the system being treated, of a surface active agent, as described herein. More preferably, the ratio of the surface active agent to the oil present in the system being treated, on an active basis, is from about 1:1000 to 1:1.

In a more preferred embodiment of this invention, the method for substantially inhibiting, preventing, limiting, and/or restricting deposition of oil on a surface of a water carrying system, as described herein, is provided wherein the ratio of the surface active agent to the oil is from about 1:100 to 1:2, and most preferably is from about 1:25 to 1:10.

In another preferred embodiment of this invention, a method for dispersing an oil in an aqueous media, as described herein, is provided wherein the aqueous media being treated is the water of a cooling system.

DETAILED DESCRIPTION OF THE INVENTION

The instant invention is directed to a surface active composition and a method for substantially inhibiting, preventing, limiting, and/or restricting deposition of an oil on a surface of a water carrying system.

As used herein, the term "effective amount" refers to that amount of a surface active agent necessary to bring about a desired result such as, for example, the amount needed to achieve substantial inhibition, prevention, limitation, and/or restriction of deposition of oil on a surface of a water carrying system. It is believed that dispersion of the oil in the aqueous media is the mechanism by which the oil is substantially prevented, inhibited, limited, or restricted from being deposited on the surface of the water carrying system, but do not intend to be bound or limited by this mechanism as effecting the prevention, inhibition, etc.

The present invention provides a surface active composition for treating an oil in an aqueous media. More specifically, the present invention provides a surface active composition for dispersing an oil in an aqueous media and/or for substantially inhibiting deposition of the oil on a surface of a water carrying system comprising (A) water containing said oil and (B) at least about 0.1% by weight, on an active basis, based on the weight of (A), of a surface active agent having the general structural formula (I)

(I)

wherein $R_1$ is a radical selected from the group consisting of (a) a first aliphatic group selected from the group consisting of (1) an alkyl and (2) an alkene having from about 1 to 3 carbon-carbon double bonds, and the first aliphatic group having from about 8 to 20 carbon atoms, and the carbon atoms having either a straight chain or a branched chain arrangement, (b) an amido group comprising the general structural formula (II)

$$C_nH_{2n-z}\overset{O}{\overset{\|}{C}}-NH[CH_2]_t- \quad (II)$$

wherein n is an integer from about 7 to 20, z is an integer from about 1 to 4 and t is an integer from about 1 to 5. R$_2$ and R$_3$ are the same or different radicals independently selected from the group consisting of (a) a second aliphatic group selected from the group consisting of (1) an alkane and (2) an alkene having from about 1 to 3 carbon-carbon double bonds, and the second aliphatic group having from about 1 to 12 carbon atoms, and the carbon atoms having either a straight chain or branched chain arrangement, (b) a polyalkylene oxide group comprising the general structural formula (III)

$$HO-\left[CH_2-\underset{\underset{R_4}{|}}{CH}-O\right]_x-Y- \quad (III)$$

wherein x is zero or an integer from about 1 to 20, R$_4$ is selected from the group consisting of hydrogen and an alkyl radical having from about 1 to 10 carbon atoms, and wherein Y is one of the alkylene groups comprising the general structural formula (IV)

$$-\underset{\underset{R_5}{|}}{CH}-\underset{\underset{R_6}{|}}{CH}- \quad (IV)$$

wherein R$_5$ and R$_6$ are hydrogen, or wherein R$_5$ is hydrogen when R$_6$ is —CH$_3$, or wherein R$_5$ is —CH$_3$ when R$_6$ is hydrogen, The alkyl group of the first or second aliphatic groups of the hereinbefore described invention includes, for example, alkyl groups such as an octyl group having 8 carbon atoms or a myristyl group having 14 carbon atoms.

The amido group having the general structural formula (II) of the hereinbefore described invention includes, for example, amido groups such as cocoamido propyl or laurylamido propyl.

The alkene group of the first or second aliphatic groups of the hereinbefore described invention includes, for example, alkene groups such as octadienyl having 8 carbon atoms and 2 carbon-carbon double bonds, or octadecatrienyl having 20 carbon atoms and 3 carbon-carbon double bonds.

It will be understood by those skilled in the art that the surface active agents of the hereinbefore described invention, and more specifically the amine oxide surface active agents of this invention, are characterized as nonionic surface active agents at neutral or alkaline pH ranges. However, in solutions having an acidic pH range, the amine oxide surface active agents of the instant invention exhibit mildly cationic properties. It will be appreciated, therefore, that the instant compositions are believed to be generally compatible with all types of surface active agents such as, for example, nonionics, anionics, cationics and amphoterics.

The surface active compositions of the instant invention are effective in aqueous media having an alkaline pH or an acidic pH. Therefore, it will be understood that the pH of the aqueous media is believed to be unimportant as the instant compositions are effective in treating oil dispersed in aqueous media over a wide range of both alkaline pH and acidic pH. Preferably, the aqueous media has an alkaline pH or a mildly acidic pH. More preferably, however, the pH of the aqueous media is from about 4 to 12. The surface active compositions of the instant invention are effective over a broad range of temperatures and the temperature of the aqueous media being treated is not believed to be critical. Preferably, the temperature of the aqueous media is at an ambient temperature not greater than about 80 degrees Centigrade.

An effective amount of the surface active composition of the instant invention should be employed. It will be appreciated by those skilled in the art that the dosage of the surface active composition added to the aqueous media is dependent on the oil content of the aqueous media and the type of oil present in the aqueous media. At least about 0.1 parts per million (ppm) of the surface active agent should be added, on an active basis, based on the weight of the water containing the oil being treated. Preferably, from about 1 to 1000 ppm of the surface active agent should be added to the aqueous media being treated for substantially inhibiting, preventing, restricting, and/or limiting the deposition of oil on a surface of the water carrying system.

The surfaces of the water carrying systems treated are generally selected from the group consisting of cooling tower surfaces, surfaces of cooling tower fill, surfaces of any means for heat exchange, surfaces of means for industrial processing, and surfaces in contact with a body of water used industrially. Cooling towers as used herein include, but are not limited to, natural draft towers including hyperbolic cooling towers, and mechanical draft cooling towers. Cooling tower fill includes, but is not limited to, all types of high performance evaporative film media, and preferably includes plastic high efficiency fill material such as, for example, "Munters" fill which is commercially available from the Munters Corporation.

The means for heat exchange includes, but is not limited to, industrial heat exchangers such as, for example, double pipe heat exchangers, shell and tube heat exchangers and jacketed vessel heat exchangers. Means for industrial processing includes, but is not limited to, devices and equipment employed for effecting industrial purposes.

It will be appreciated by those skilled in the art that the surface active composition of the instant invention may be employed to inhibit deposition on surfaces of any water carrying systems in fluid communication with virtually any body of water such as, for example, oceans, seas, rivers, lakes, ponds, and streams and, thus, the instant surface active agents can be used to disperse and emulsify oil spills in ocean waters, sea waters, rivers, lakes, etc.

In a most preferred embodiment of this invention, the surface active agent, as hereinbefore described, includes wherein R$_1$ is a myristyl group and R$_2$ and R$_3$ are each a methyl group.

In another embodiment of the instant invention, the surface active agent of this invention, as hereinbefore described, includes wherein R$_1$ is a coco group, and R$_2$ and R$_3$ are each a methyl group.

In a further embodiment of this invention, the surface active agent, as hereinbefore described, includes wherein R$_1$ is a coco group, and R$_2$ and R$_3$ are each a 2-hydroxyethyl group.

In another embodiment of this invention, the surface active agent, as hereinbefore described, includes wherein R$_1$ is a cocoamido propyl group and R$_2$ and R$_3$ are each a methyl group.

A further embodiment of the instant invention provides for the surface active agent, as hereinbefore described wherein R$_1$ is a lauryl group and R$_2$ and R$_3$ are each a methyl group.

Another embodiment of this invention provides for the surface active agent, as hereinbefore described, wherein R$_1$ is a lauramido group and R$_2$ and R$_3$ are each a methyl group.

In yet another embodiment of the instant invention, the surface active agent, as hereinbefore described, provides wherein $R_1$ is a myristylcetyl group and $R_2$ and $R_3$ are each a methyl group.

Another embodiment of the instant invention provides a method for substantially inhibiting, preventing, limiting, and/or restricting the deposition of oil on a surface of a water carrying system comprising adding to an aqueous media in contact with the surface, wherein the aqueous media contains the oil, an effective amount of the surface active agent of the instant invention, as hereinbefore described, wherein the ratio of the surface active agent to the oil is from about 1:1000 to 1:1. Preferably, the method for substantially inhibiting the deposition of oil on a surface of the water carrying system of the hereinbefore described invention comprises adding the surface active agent to the aqueous media wherein the ratio of surface active agent to the oil is from about 1:100 to 1:2, and most preferably from about 1:25 to 1:10. In a preferred embodiment of this invention, the method, as hereinbefore described, provides for dispersing the oil in the aqueous media comprising adding to the aqueous media laden with oil an effective amount of the surface active agent of the invention, as described herein, and more preferably, this method provides wherein the aqueous media being treated is the water of a cooling system.

In a more preferred embodiment of this invention, the method of this invention, as hereinbefore described, includes substantially inhibiting the deposition of oil on a surface of the water carrying system wherein the aqueous media has a pH from about 4 to 12.

In a most preferred embodiment of this invention, the method of this invention, as hereinbefore described, includes substantially inhibiting the deposition of oil on a surface of the water carrying system wherein the aqueous media being treated is waters of a cooling system. This method further includes substantially inhibiting the deposition of oil on a surface of the water carrying system wherein the aqueous media is at an ambient temperature not greater than about 80 degrees Centigrade.

The surface active composition of the instant invention can be added to the water carrying system by any convenient means. It is believed that addition of the instant surface active compositions to cooling tower waters is well within the skill of those persons familiar with cooling tower operations.

It will be appreciated by those skilled in the art that the surface active compositions of this invention may be used in conjunction with other cooling tower additives including, but not limited to, corrosion inhibitors, scale inhibitors, agents to control or inhibit the deposition of generally insoluble materials such as, for example, alluvial solids, clays, muds, silts, metallic scales, and metallic salts or oxides, and biocides for microbial control.

EXAMPLES

The following examples demonstrate the invention in greater detail. These examples are not intended to limit the scope of the invention in any way. In the examples, the following products were used for comparison purposes:

Block copolymer of propylene oxide and ethylene oxide is commercially available from BASF as Pluronic L-81.

Nonylphenoxy poly(ethyleneoxy) ethanol is commercially available from Rhone-Poulenc as Igepal CO710.

Sorbitan monostearate is commercially available from ICI Americas as Span 61.

Sodium dioctyl sulfosuccinate is commercially available from American Cyanamid as Aerosol GPG.

Dicocodimethyl ammonium chloride is commercially available from Armak as Arquad 2C-75.

Caprylamido propyl betaine and capra amido betaine are commercially available from Alcolac as Cycloteric BET-OD 40.

EXAMPLES 1–10

In Examples 1–10, various surface active compositions were tested for their effectiveness in dispersing oil in an aqueous media.

Table I shows surface active compositions, Examples 1–10, that were tested in each of the following categories: nonionic, anionic, cationic, and amphoteric surface active agents and the amine oxide surface active agents of the instant invention. The make-up of each composition, Examples 1–10, is shown in Table I. For each example, the testing procedure involved dosing 100 parts per million (ppm) of active surface active agent into a liter of industrial cooling water obtained from a steel mill that was dosed with 500 ppm of Klingfast 256 oil, commercially available from Brooks Technology Co., Cleveland, Ohio. The Klingfast 256 oil had a viscosity, at room temperature, of 9600 centipoise (cps). It is believed that the order of addition of surface active agent and oil to the aqueous media is unimportant. The industrial cooling water was at a temperature of about 20 degrees Centigrade and was at a neutral pH ranging from about 7.0 to 7.6.

After introducing each surface active agent of Examples 1–10 into each sample of oil and industrial cooling water, respectively, the treated oil and industrial cooling water samples were stirred for about 20 minutes and then observed to determine the effect of each surface active agent in the industrial cooling water containing oil. The right column of Table I, designated "Appearance", shows the observed results of introducing the surface active agents of Examples 1–10 to the oil and industrial cooling water samples. In Table I, the appearance is noted for each example as "Excellent" if the addition of the surface active agent produced a dispersion having fine oil droplets, "Good" if fine to small oil droplets were produced, "Fair" if small to medium oil droplets were produced, and "Fail" if medium to large oil droplets were produced.

TABLE I

| EXAMPLE NUMBER | CATEGORY | CHEMICAL COMPOSITION | APPEARANCE |
| --- | --- | --- | --- |
| 1* | Nonionic | Block copolymers of propylene oxide and ethylene oxide | Fail |
| 2* | Nonionic | Nonylphenoxy poly(ethyleneoxy) ethanol | Fail |
| 3* | Nonionic | Sorbitan monostearate | Fail |
| 4* | Anionic | Sodium dioctyl sulfosuccinate | Fail |

TABLE I-continued

| EXAMPLE NUMBER | CATEGORY | CHEMICAL COMPOSITION | APPEARANCE |
|---|---|---|---|
| 5* | Cationic | Dicocodimethyl ammonium chloride | Fail |
| 6* | Amphoteric | Caprylamido propyl betaine and capra amido betaine | Fail |
| 7 | Amine Oxide | Cocoamido propyl dimethyl amine oxide | Fair |
| 8 | Amine Oxide | Lauryl dimethyl amine oxide | Good |
| 9 | Amine Oxide | Myristyl dimethylamine oxide | Excellent |
| 10 | Amine Oxide | Cocodimethyl amine oxide | Excellent |

* = Comparison Examples

Table I shows that the surface active agents of the instant invention, Examples 7–10, produced superior results in comparison to the nonionic, anionic, cationic and amphoteric surface active agents of Examples 1–6. It was found that the amine oxide surface active agents of the instant invention, Examples 9 and 10, myristyl dimethylamine oxide and cocodimethyl amine oxide, respectively, produced the most preferred dispersion of oil in the aqueous media of the industrial cooling water.

Table I shows that the nonionic surface active agents, Examples 1–3, the anionic surface active agent, Example 4, the cationic surface active agent, Example 5, and the amphoteric surface active agent, Example 6, failed to effectively disperse the oil in the industrial cooling water tested.

EXAMPLES 11–18

Examples 11–18 demonstrate the effectiveness of the surface active agents of this invention in dispersing oil in an aqueous media, and in substantially inhibiting deposition of the oil on a surface of a water carrying system. The surface active agents of the instant invention, Examples 13–16, were tested for their ability to inhibit oil from adhering to plastic cooling tower fill used in the cooling tower of a steel mill. The plastic cooling tower fill tested comprised pieces of polyvinyl chloride fill.

Table II shows the make-up of each of the surface active agents tested. Examples 11–12 served as controls, wherein a piece of polyvinyl chloride cooling tower fill was immersed for about 2 hours in a liter of tap water that was dosed while stirring with 500 ppm of oily sludge from an industrial cooling tower of a steel mill. The tap water had a hardness of about 40 ppm expressed in terms of calcium carbonate, $CaCO_3$. For the other examples, the test procedure involved adding the amount of surface active agent set forth in Table II as parts per million (ppm), based on the weight of the water, into a liter of tap water that was dosed with 500 ppm of the oily sludge described above. The tap water was at a temperature of about 20 degrees Centigrade and was held at a pH ranging from about 7.0 to 7.6, and the test solutions were stirred throughout the procedure.

Results were obtained by weighing each piece of polyvinyl chloride tested before and after contact with the oily sludge. Thus, each piece of polyvinyl chloride cooling tower fill was immersed for about two hours in a 1000 ml beaker containing the oily sludge—tap water mixture dosed with the respective amounts of active surface active agents of Examples 11–18, as set forth in Table II. Next, each piece of polyvinyl fill was removed from the beakers, dried in an oven for about one hour, and reweighed. The weight gain, the surface area of the piece of polyvinyl chloride cooling tower fill, and elapsed time were used to determine the deposition rate and the percent reduction of oil deposition on the polyvinyl cooling tower fill. The percent reduction of oil deposition on the polyvinyl cooling tower fill for Examples 13–18 was based on the average deposition value for the controls, Examples 11–12.

TABLE II

| EXAMPLE NUMBER | CHEMICAL COMPOSITION | ACTIVE DOSAGE (ppm) | DEPOSITION IN 2 HOURS (lb./1000 ft.$^2$) | % REDUCTION OF OIL DEPOSITION |
|---|---|---|---|---|
| 11 | Control | 0 | 0.705 | 0 |
| 12 | Control | 0 | 0.908 | 0 |
| 13 | Myristylcetyl dimethyl amine | 100 | 0.00758 | 99 |
| 14 | Bis(2-hydroxy ethyl) cocoamine oxide | 100 | 0.0228 | 97 |
| 15 | Myristyl dimethyl amine oxide | 100 | 0.000 | 100 |
| 16 | Cocoamine oxide | 100 | 0.00967 | 97 |
| 17 | Myristyl dimethyl amine oxide | 50 | 0.0339 | 96 |
| 18 | Cocoamine oxide | 50 | 0.0240 | 97 |

Table II shows that while between 0.705 and 0.908 pounds per 1000 square foot (lb./1000 ft.$^a$) of oil deposited in about 2 hours on the piece of polyvinyl chloride cooling tower fill with no treatment (controls, Examples 11 and 12), less than 0.0339 lb./1000 ft.$^a$ of oil deposited in about 2 hours on the polyvinyl chloride cooling tower fill when treated with the surface active agents of the instant invention, Examples 13–18. It was found that about 100 ppm of surface active agent of this invention, Example 15, myristyl dimethyl amine oxide effectively inhibited substantially all deposition of oil on the polyvinyl chloride cooling tower fill.

It will be understood by those skilled in the art that the data of Table II clearly shows that the surface active compositions of the instant invention, Examples 13–18, produced from about 96 to 100 percent reduction of oil deposition on the surface of the polyvinyl chloride cooling tower fill.

From the above data, it will be appreciated by those skilled in the art that the amine oxide surface active compositions of the instant invention significantly improve the dispersion of an oil in an aqueous media, and substantially inhibit deposition of the oil on a surface of a water carrying system over conventional anionic, cationic, nonionic and amphoteric surface active compositions. The dispersion capabilities of the surface active compositions of the instant invention have the advantages of producing cleaner industrial cooling operations, therefore, resulting in longer operation time between cleaning of the industrial cooling operations, and improving heat transfer while reducing the energy requirements for pumping operations.

Whereas particular embodiments of the instant invention have been described for purposes of illustration, it will be evident to those skilled in the art that numerous variations and details of the instant invention may be made without departing from the instant invention as defined in the appended claims.

What is claimed is:

1. A method for inhibiting deposition of an oil on a surface of a water carrying system which is a cooling tower, cooling tower fill, cooling system or means for heat exchange comprising adding to an aqueous media in contact with said surface, wherein said aqueous media contains said oil, at least about 0.1 ppm, on an active basis, based on the weight of said aqueous media, of a surface active agent comprising the general structural formula (I)

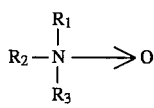
(I)

wherein $R_1$ is a radical selected from the group consisting of (a) a first aliphatic group selected from the group consisting of (1) an alkyl and (2) an alkylene having from about 1 to 3 carbon-carbon double bonds, said first aliphatic group having from about 8 to 20 carbon atoms, said carbon atoms having either a straight chain or a branched chain arrangement, and (b) an amido group comprising the general structural formula (II)

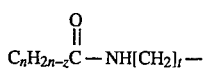
(II)

wherein n is an integer from about 7 to 20, z is an integer from about 1 to 4 and t is an integer from about 1 to 5, and wherein $R_2$ and $R_3$ are the same or different radicals independently selected from the group consisting of (a) a second aliphatic group selected from the group consisting of (1) an alkyl and (2) an alkylene having from about 1 to 3 carbon-carbon double bonds, said second aliphatic group having from about 1 to 12 carbon atoms, said carbon atoms having either a straight chain or branched chain arrangement, and (b) a polyalkylene oxide group comprising the general structural formula (III)

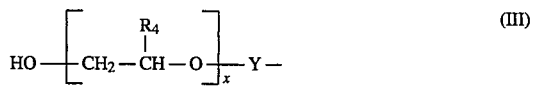
(III)

wherein x is zero or an integer from about 1 to 20, $R_4$ is selected from the group consisting of hydrogen and an alkyl radical having from about 1 to 10 carbon atoms and wherein Y is one of the alkylene groups comprising the general structural formula (IV)

(IV)

wherein $R_5$ and $R_6$ are hydrogen, or wherein $R_5$ is hydrogen when $R_6$ is —$CH_3$, or wherein $R_5$ is —$CH_3$ when $R_6$ is hydrogen, and wherein the ratio of said surface active agent to said oil is from about 1:1000 to 1:1.

2. The method of claim 1 wherein $R_2$ and $R_3$ of said surface active agent are each a methyl group and wherein $R_1$ is a group selected from the group consisting of a myristyl group, a coco group, a cocoamido propyl group, a lauryl group, a lauramido propyl group and a myristylcetyl group.

3. The method of claim 1 wherein $R_1$ of said surface active agent is a coco group, and $R_2$ and $R_3$ are each a 2-hydroxyethyl group.

4. The method of claim 1 wherein said ratio of said surface active agent to said oil is from about 1:100 to 1:2.

5. The method of claim 1 wherein said ratio of said surface active agent to said oil is from about 1:25 to 1:10.

6. The method of claim 1 wherein said aqueous media has a pH from about 4 to 12.

* * * * *